United States Patent [19]
Gudmundsen

[11] 3,833,762
[45] Sept. 3, 1974

[54] SOLID STATE INTEGRATING, IMAGE MOTION COMPENSATING IMAGER

[75] Inventor: Richard A. Gudmundsen, Santa Ana, Calif.

[73] Assignee: Rockwell International Corporation, El Segundo, Calif.

[22] Filed: June 4, 1973

[21] Appl. No.: 366,828

[52] U.S. Cl......... 178/7.1, 178/DIG. 40, 250/211 J, 250/578
[51] Int. Cl............................................... H04n 5/30
[58] Field of Search.............. 178/7.1, 7.2, DIG. 40; 250/578, 211 J, 211 R; 317/235 N

[56] References Cited
UNITED STATES PATENTS
3,536,829 10/1970 Gebel.................................. 178/7.1
OTHER PUBLICATIONS
IBM Technical Disclosure Bulletin, Vol. 15, No. 11, April, 1973, p. 3506.

*Primary Examiner*—Robert L. Richardson
*Attorney, Agent, or Firm*—L. Lee Humphries; H. Fredrick Hamann; G. Donald Weber, Jr.

[57] ABSTRACT

An integrating image motion compensator is disclosed. The compensator comprises photo-responsive charge transfer means, overlying transparent insulation means and transparent charge transfer electrode means spaced from the charge transfer means by the insulation means. Channel isolation means associated with the charge transfer means define individual charge transfer channels. The operating system further comprises means for inducing separate charge collection regions within each channel and for transferring the regions along the charge transfer means at a controllable rate. Image speed sensing means sense the image speed and synchronize the rate of charge transfer with the rate of image movement. When large area image motion compensators are needed, optical image segmentation means are provided to allow the use of many small compensators to form a composite, large, image motion compensator. In the preferred embodiment the photo-responsive charge transfer means is a semiconductor layer having a gap energy less than the energy of the photons forming the image to be converted. A plurality of parallel charge transfer channels are defined at the surface of the semiconductor by stripes of heavily doped semiconductor material which isolates the channels. The transparent control electrodes are preferably divided into four sets to form a four-phase charge transfer control system. The photons comprising the image to be converted are incident on the semiconductor through the overlying transparent insulator and electrodes. Potential wells within the charge transfer channels are stepped along the channels at the same rate at which the image is traveling along the channel. Thus, all the photons arriving from a given image point strike in the same potential well and contribute to the charge therein. At the end of the transfer channel, any charge therein is sensed in any appropriate manner, such as by a back-biased pn junction.

Non-transparent control electrodes may be employed if a thin semiconductor chip is used, and the light is focused onto the back surface of the device.

24 Claims, 9 Drawing Figures

SOLID STATE INTEGRATING, IMAGE MOTION COMPENSATING IMAGER

BACKGROUND OF THE INVENTION

1. Field of the Invention

This invention relates to the field of photo diode image converters and more particularly to such converters for converting moving images.

2. Prior Art

The use of arrays of photo diodes for image disection is known in the art. Such photo diode arrays utilize separate pn junctions to collect the charge carriers generated by incident photons. A current collected by individual photo diodes is passed through an addressing matrix to an output terminal. The current through the output terminal constitutes an electrical representation of the image focused on the photo diode array. Such arrays have the disadvantage that they require a significant quantity of decoding logic and metallurgy and the space required for these components severely limits the resolution which may be achieved with such an array.

The use of a line of photo diodes to disect a moving image is also known in the art. In such systems the line of photo diodes is arranged perpendicular to the direction of image motion. With such systems slowly moving images are easily converted with fair resolution. However, a fast moving "dim" image is poorly converted because not enough photons from a given image element strike the photo diodes to give a high resolution output.

OBJECTS OF THE INVENTION

A primary object of the invention is to provide a scan converter which provides gain by integration of the number of photons arriving from a given moving image element.

Another object of the invention is to provide an image motion compensator whose operation is instantaneously adjustable to correspond to the rate of motion of the image being converted.

SUMMARY OF THE INVENTION

The invention is an integrating image motion compensator comprising a photo-responsive charge transfer means having overlying transparent insulation means and transparent charge transfer electrode means for controlling transfer of charge through the charge transfer means. Alternatively, a thin semiconductor chip may be employed using insulation means and charge-transport electrode means either or both of which are non-transparent. In such an alternative, the photons would impinge on the silicon surface opposite to that on which the electrodes were fabricated. A channel isolation means associated with the charge transfer means defines individual charge transfer channels. The operating system further comprises means for inducing separate charge collection regions within the charge transfer means and for transferring the regions along the charge transfer means at a controllable rate. The system may further comprise an image speed sensing means for sensing the rate of movement of the image being converted and for synchronizing the rate of transfer of charge through the charge transfer means with the image rate of movement. Where the direction of image motion with respect to the charge transfer means is not pre-established, orientation means are also provided for orienting the charge transfer channels parallel to the direction of image movement.

The charge transfer means is preferably an n-type silicon layer which is divided into a plurality of parallel charge transfer channels by isolation regions of more heavily doped n-type silicon. The isolation regions run parallel to the channels, and separates them by providing a region which is more difficult to invert than the channel regions.

The charge transfer control electrode means preferably comprise a four-phase set of control electrodes positioned in first and second parallel planes, with every other electrode being in the first plane. Each electrode in the first plane overlaps the electrodes on either side of it in the second plane. A control means applies potential-well-inducing voltages to the four electrode sets to induce separate charge collection regions within the semi-conductor and switches the voltages to step the charge collection regions along the channel.

An incident photon of appropriate energy will generate photominority carriers which will collect in the deepest part of the potential well in which they are generated or into which they drift. The generated charges which collect in the potential wells move with the potential wells along the channel. With proper synchronization, each potential well moves at the same rate as an image moving along the channel. Therefore, all photons incident from a given image point strike the semiconductor in the same potential well. As the potential well moves along the channel more and more charges generated by photons from the given image point collect in the potential well. This provides an integrating effect which improves the intensity resolution of the converted image. At the end of each channel the charge contained in a potential well is sensed in any appropriate manner to provide an output representative of the intensity of the image point focused on the potential well being sensed.

Image segmentation means, such as a beam splitter, produce spatially separated image segments which allow the use of many small compensators to form one composite compensator without loss of image segments between adjacent small compensators.

DEFINITIONS

As used throughout this patent the term "a photoresponsive charge transfer means" shall mean a charge transfer means in which incident photons generate charges which may be transferred in the same manner as other charges. A semiconductor having a gap energy (E gap) less than the energy ($h\nu$) of the incident photon is the preferred photo-responsive charge transfer means.

The term transparent, as used in describing components of the structure, means that the material does not accessively attenuate the incident light (photons) which constitutes the image to be converted.

DESCRIPTION OF THE PREFERRED EMBODIMENT

Figure 1:
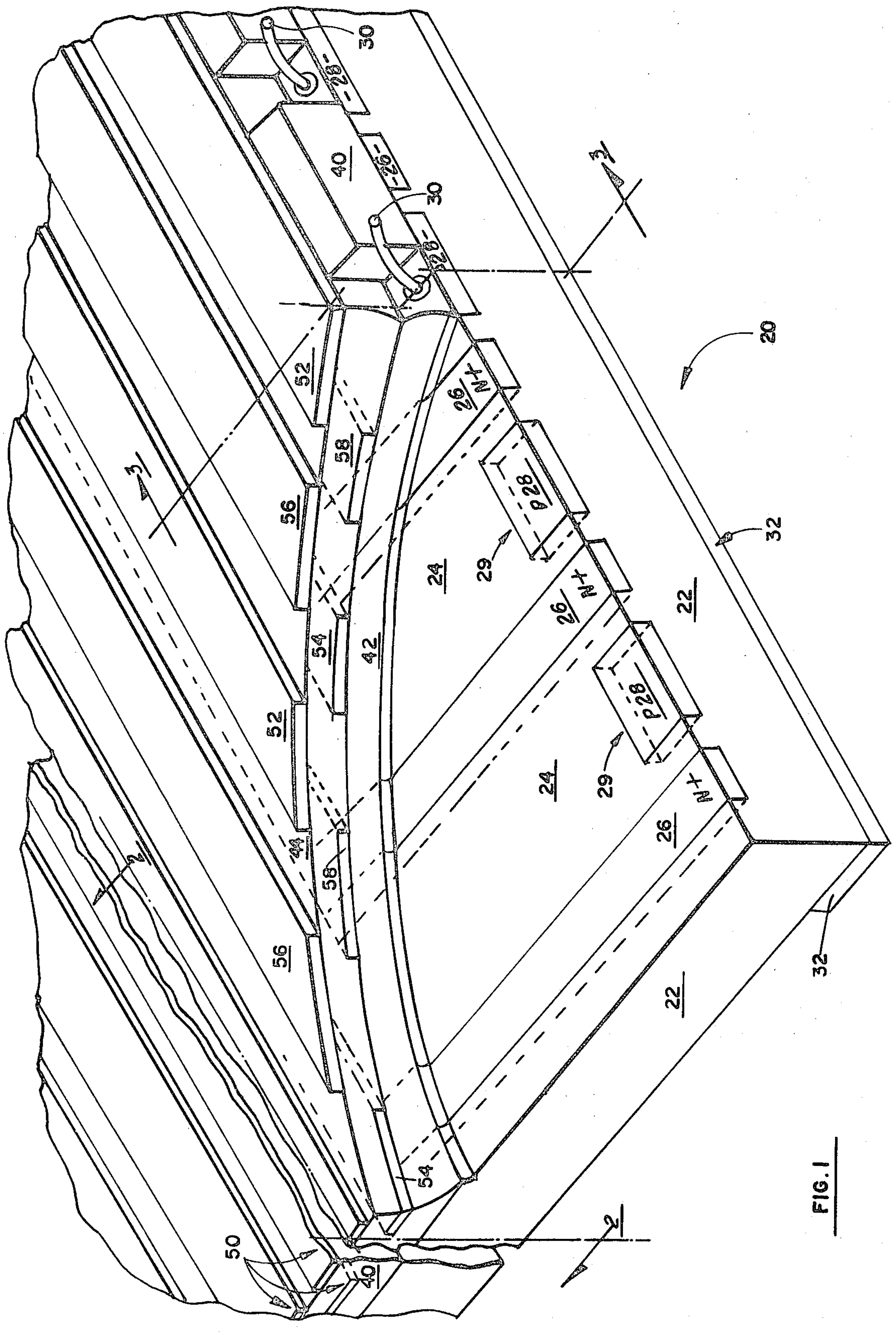
FIG. 1 is an overall partially cutaway perspective view of the preferred embodiment of the integrating image motion compensator.

The preferred embodiment of the integrating image motion compensator of this invention is indicated generally at 20 in FIG. 1. A photo-responsive charge transfer means 22 has overlying transparent insulation means 40 which spaces transparent charge transfer control electrode means 50 from the photo-responsive charge transfer means 22. Charge transfer control electrode means 50 preferably comprises a plurality of control electrodes whose format depends on what type of charge transfer mechanism is used in the charge transfer means 22 and on how many phases of control voltage are employed to control the transfer. Preferably a four phase system is employed with electrodes of the first and third phases in one plane and the electrodes of the second and fourth phases in another parallel plane. The two electrode planes are spaced from the charge transfer means 22 by differing amounts. A first of the planes is spaced from the transfer means 22 by a region 42 of insulation means 40. A second plane is spaced from the first plane by region 44 of the insulation means 40. Thus the electrodes in the two planes are insulated from each other. In the preferred four phase system, electrodes 52 of the first set and electrodes 56 of the third set are in a common plane and spaced the greatest distance from the charge transfer means 22. The electrodes 54 of the second set and 58 of the fourth set are in a common plane between the electrodes 52, 56 and the charge transfer means 22. The electrodes 52 and 56 each overlap a portion of the underlying electrodes 54 and 58 on either side thereof. The electrodes 52, 54, 56, and 58 occur sequentially in a cyclically repeating pattern as the device is traversed in one direction, the cyclic pattern of being 52, 54, 56, 58, 52. Channel isolation means 26 associated with the upper surface of transfer means 22 are arranged substantially perpendicular to the length of the electrodes. Channel isolation means 26 define a plurality of individual charge transfer channels 24 at the surface of charge transfer means 22. At the output end of each channel is a readout region 28 for sensing any charges in the channel at the output point. Where the charge transfer means 22 is n-type silicone, output regions 28 are p-type silicon and form a charge collecting pn junction 29. Each output region 28 has an output lead 30 connected thereto for carrying the output current. A bottom electrode 32 makes ohmic contact with the bottom of the charge transfer means 22 in order that control voltages may be applied between the charge transfer means 22 and the various electrodes and output regions.

Figure 2:
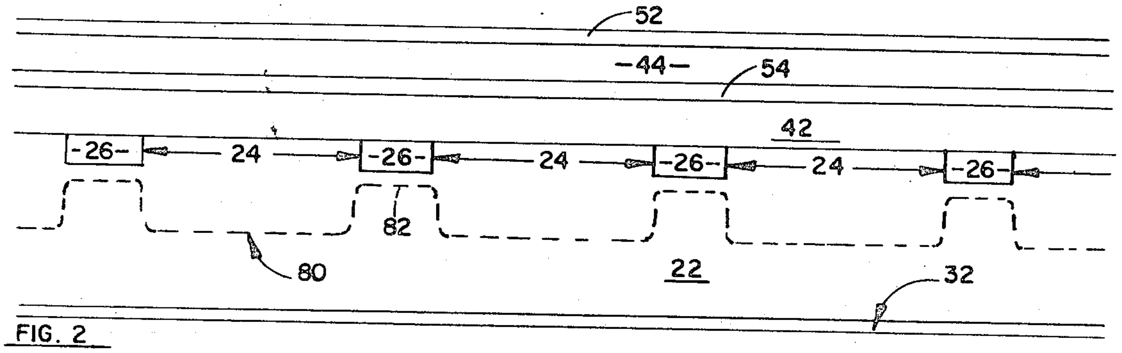
FIG. 2 is a cross-section taken through the structure of FIG. 1 along the line 2—2 looking in the direction of the arrows and illustrates the channel isolation means.

FIG. 2 illustrates a cross-section of the device taken along the line 2—2 looking in the direction of the arrows. Isolation regions 26 are shown inlaid into the upper surface of charge transfer means 22. The potential wells formed in charge transfer means 22 by application of an negative voltage to electrode 54 is illustrated at 80. It will be noted that the potential well is significantly deeper in a transfer channel 24 than it is under an isolation region 26, this provides the isolation which prevents cross-talk between adjacent channels.

Figure 3A:
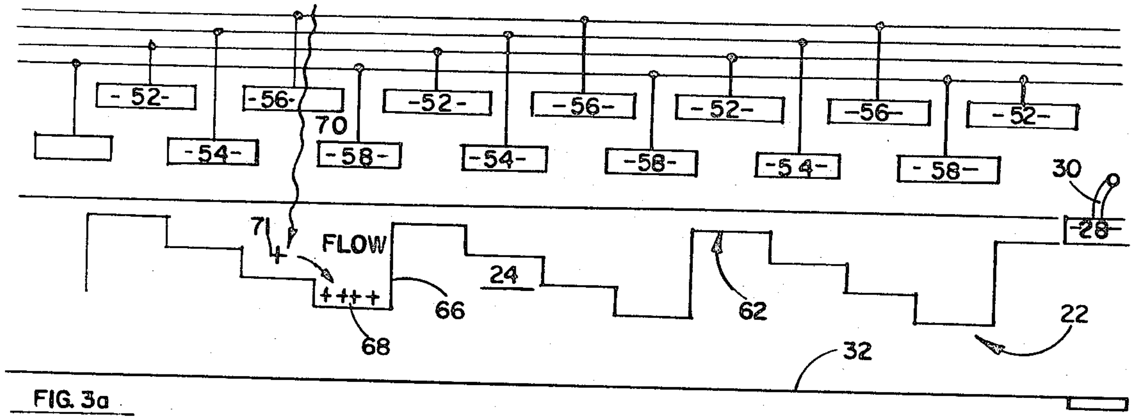
FIGS. 3*a*, *b* and *c* are each a cross-section taken through the structure of FIG. 1 along the line 3—3 looking in the direction of the arrows. The successive FIGS. *a*, *b*, and *c* illustrate the movement of potential wells along a channel.
Figure 3B:
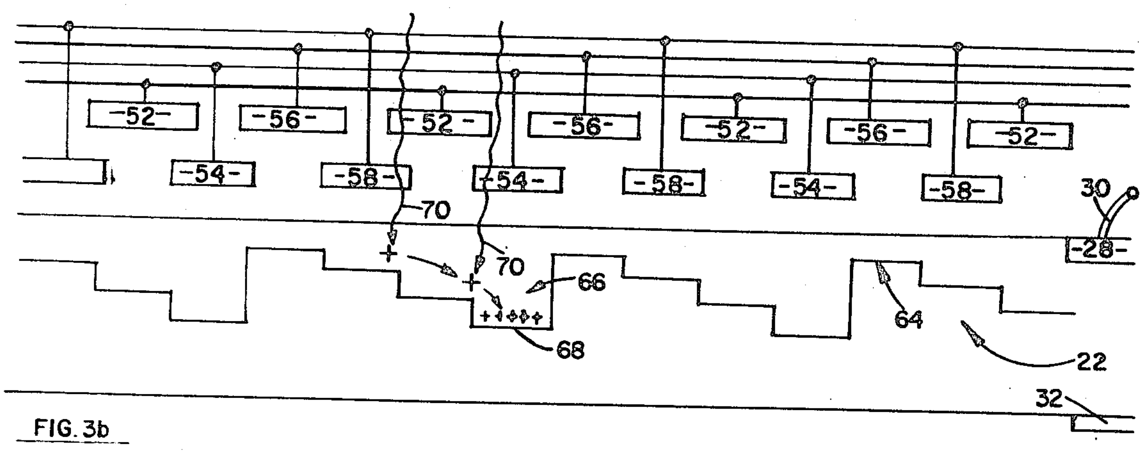
Figure 3C:
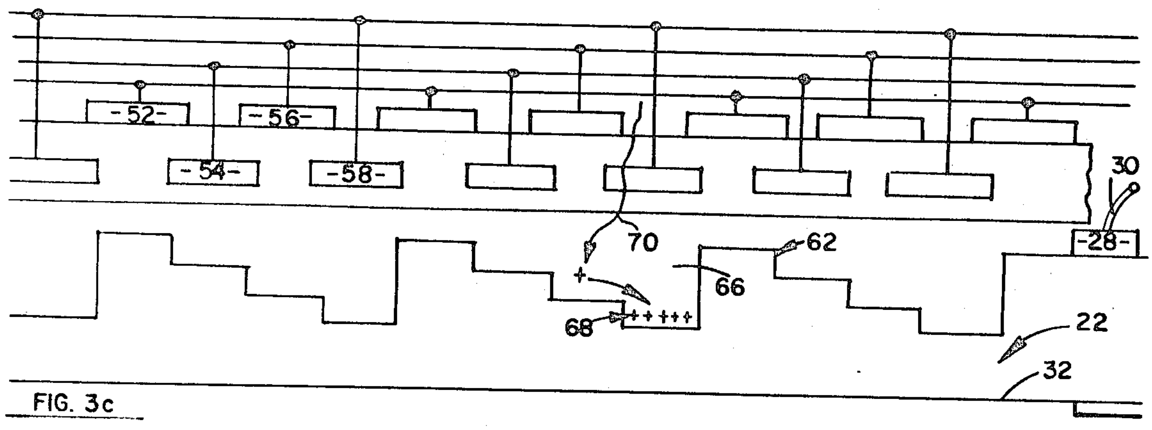

FIGS. 3*a*, 3*b* and 3*c* are cross-sections of the device in FIG. 1 taken along the line 3—3 looking in a direction of the arrows. The overlapping relationship of the electrodes 52 and 56 over electrodes 54 and 58 is shown clearly in this figure. The interconnection of the electrodes is illustrated schematically to show that all electrodes of a given set are connected to a common bias bus. The potential well pattern inducted in region 22 by the voltages applied to the control electrodes is illustrated at 62 in FIG. 3*a*. Each potential well constitutes a separate charge collecting region. A selected potential well or charge collecting region 66 is illustrated as containing collected charge 68. An incident photon 70 generates a minority carrier 71 within the well 66 and the newly generated carrier drifts into the deepest potential region in the well 66 and becomes part of the charge 68. FIGS. 3*b* and 3*c* illustrate succeeding potential well patterns that will be discussed further in connection with the operation of the device.

Transparent insulators and control electrodes are utilized in the preferred implementation in order that the image may be focused on the device from above. This provides a better photon-to-charge-in-a-well conversion efficiency than is obtained when the image impinges from the bottom of the semiconductor. This is a result of the fact that the majority of photons are absorbed before they penetrate to a depth at which the generated charge is not collected by the potential well. With illumination from below, many of the generated carriers recombine before entering the potential wells, even when very thin silicon devices are used.

For maximum sensitivity, the silicon layer's <100> crystal face is used as its upper surface. This provides maximum charge transfer efficiency and maximum retention of charge in the potential wells.

Figure 7:
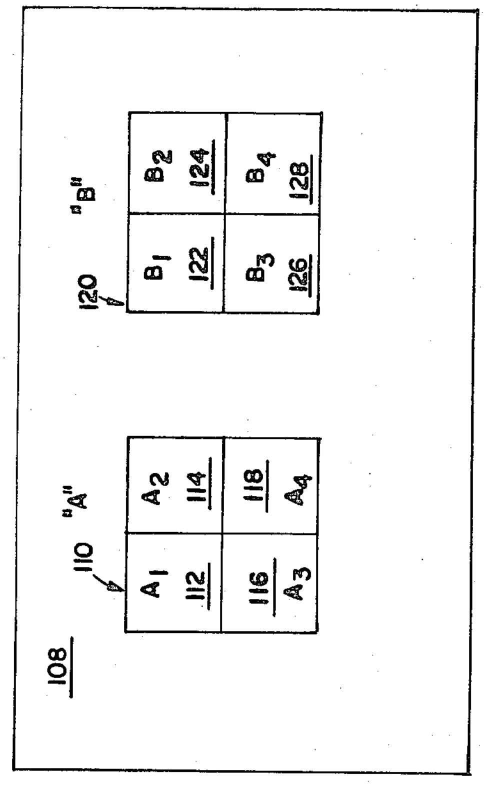
FIG. 7 illustrates the use of small area image motion compensators with the image segmenting system to form a composite large area compensator.
Figure 4:
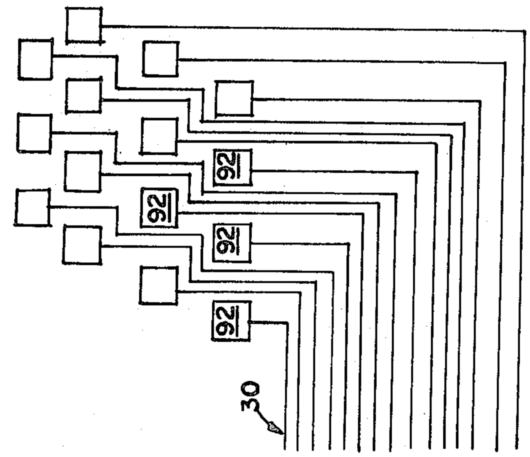
FIG. 4 illustrates the preferred method of providing contact tabs for making connection to the output leads from the charge sensing means.
Figure 6:
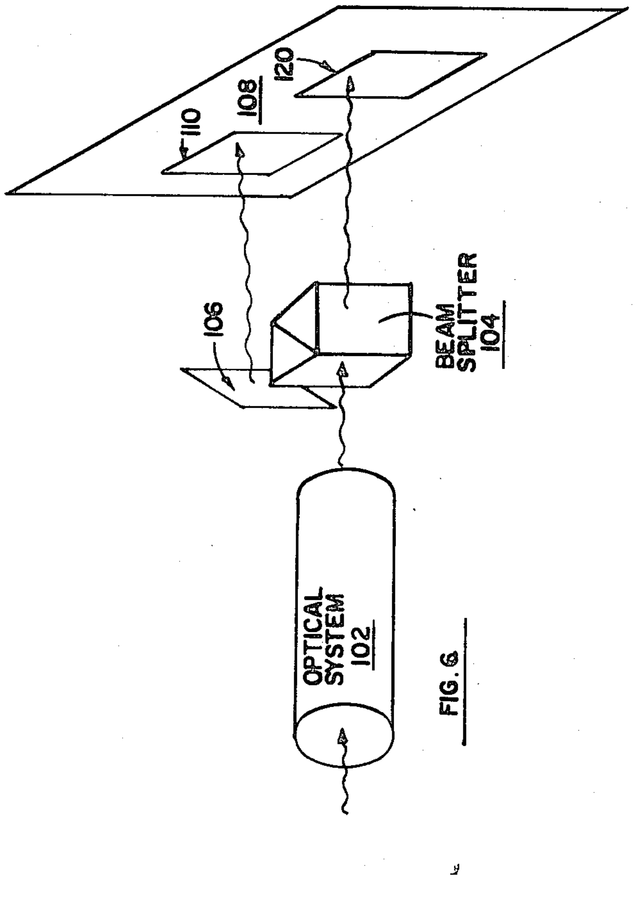
FIG. 6 illustrates an image segmenting system for use where large area image motion compensators are needed.

FIG. 4 illustrates a representative portion of output connection pads 92 for connecting output leads 30 to external wiring. If such pads are 100 microns square, then in the four deep array shown two inches of device linear periphery are required to accommodate the pads of a 1,000 channel compensator. This makes a 1,000 channel device fairly large in area and gives it a significant surface area which is optically inactive. To prevent loss of data when larger area compensators are needed, an image segmenting system such as that illustrated in FIG. 6 is employed. Light constituting the image passes through an optical system 102 and is incident on a beam splitter 104. The beam splitter divides the beam into two equal portions, one of which passes straight through the beam splitter and the other of which is reflected at right angles to the original beam. A mirror 106 reflects the second beam so that both beams are parallel. The beams impinge on separate portions 110 and 120 of an image plane 108. As illustrated in FIG. 7, the image areas 110 and 120 which will be referred to as image A and image B, can be segmented into separate regions A1 through A4 and B1 through B4. If single integrating image motion compensators are placed to receive the light constituting image segments A1, A4, B2, and B3 then the composite of all the information from the individual image motion compensators will constitute a composite for the entire image area. The areas A2, A3, B1 and B4 may be employed for readout wiring since the information incident thereon is duplicative and need not be converted. Depending on device configuration, it may be necessary to utilize more than two separate images A and B in order to provide a composite output without loss of any information due to the intercompensator dead space which would exist if a single image were used. It is preferred to have a compensator overlap of one or two channels to allow electronic alignment of the image. Other image segmenting means than beamsplitters may be employed, if desired. Better sensitivity is obtained with a special purpose image splitter which directs different portions of the image to different areas. Some detail may be lost at the line separating the different image segments because the line will not be of zero width. However, with the resolution cell size limitation established by the charge collection regions, this should not effect image resolution when well constructed optics are employed.

Figure 5:
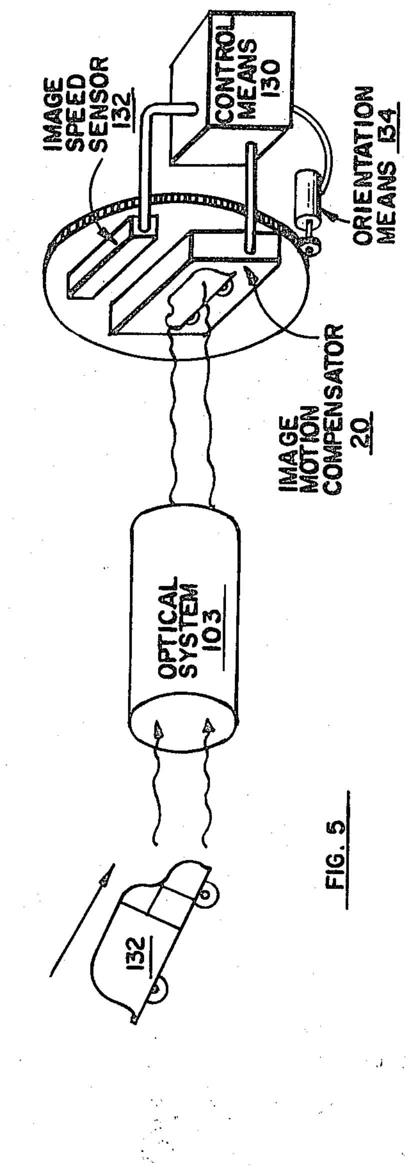
FIG. 5 schematically illustrates the relative position of the original image, an optical system, the integrating image motion compensator, an image speed sensor and a system control means.

An overall system utilizing an integrating image motion compensator is illustrated in FIG. 5. A moving object such as a truck 132 moves with a component of motion parallel to the surface of the integrating image motion compensator. The image of truck 132 is projected onto the integrating image motion compensator by an optical system 102. Charge transfer within the motion compensator 20 is controlled by a control means 130 which receives image speed information from a rate sensor 130 if the speed of the image is not preset. Control means 130 which constitutes a means for inducing separate charge collecting regions within the charge transfer means, then adjusts the charge transfer rate within the motion compensator so that a given potential well moves at the same speed as the image. Rate sensor 130 may obtain its rate information in any well-known manner either through main optical system 102 or through an auxiliary optical system. If the transfer channels 24 are not aligned parallel to the direction of movement of the truck, then image orientation means 134 rotates compensator 20 until the channels are parallel to the direction of image motion.

The image resolution of this image converter is limited to a minimum area having a width equal to the width of a channel 24 and a length equal to the length of one cycle of the control electrode pattern. With current technology, this area is limited to approximately 12 microns by 16 microns if high device yields are to be obtained. However, as device process control improves, the minimum area of the cell should reduce somewhat, thus improving resolution.

Where the resolution element is rectangular rather than square, it is advantageous to use an astigmatic optical system which utilizes the area most effectively. In the instance of 12 by 16 micron cells, a lens system which is slightly cylindrically astigmatic provides maximum cell illumination and thus sensitivity.

OPERATION OF THE DEVICE

To operate the device, control means 130 applies control voltages to the control electrodes to induce potential wells within the individual channel 24. It is preferred to have the potential wells take the form illustrated in FIG. *3a* by curve 62. The use of a step type potential well pattern such as this enables the use of two successive well patterns, that in FIG. *3a* and that in FIG. *3b* without other intervening patterns. With this well pattern, only two voltage changes are used to advance a potential well a full cycle. The voltages change from those inducing the potential well pattern of FIG. *3a* to those inducing the pattern of FIG. *3b* back to those inducing the pattern of FIG. *3a* (or FIG. *3c*). Referring to FIG. *3a*, a given potential well designated 66 is selected for detailed discussion. An incident photon 70 will generate a hole-electron pair with the semiconductor material. The minority carrier 71, a hole in the case of an n-type region 22, is attracted to the deepest part of well 66 by the field resulting from the potential difference between it and the adjacent potential steps. Such charge collects in the bottom of the deepest part of the well as at 68. The control voltages and thus the potential well pattern are stepped along through the channel at the same rate as the image moves along the channel. As illustrated in FIG. *3b*, the collected charge 68 follows the deepest part of the potential well 66. As more photons generate charge within the potential well, the quantity of charge 68 in the well increases. So long as the charge is restricted to the lowest part of the potential well, under electrode 58 in FIG. 3a or electrode 54 in FIG. *3b*, substantially all the charge stays within the selected potential well. However, when charge accumulates over the first step of the potential well, under electrode 56 in FIG. *3a* or electrode 52 in FIG. *3b*, some of the charge is either destroyed by recombination or left behind in the succeeding potential well when a well pattern changes from that shown as 62 in FIG. *3a* to that shown as 64 in FIG. *3b*. In changing between patterns 62 and 64, any charge under an electrode 56 will tend either to be boosted out of the inversion region when the potential well decreases in depth and thus forced to recombine or it may be left behind or flow backwards into the deep potential well newly formed under electrode 54. This tends to generate a smear of charge across successive potential wells where a high intensity image point is followed by a very low intensity image point. This effect, however, is limited to a smear of only a few potential wells. To sense the charge collected in a potential well of the channel, a readout p+-type region is formed in the n-type channel which at the time of readout is inverted to form a p-region. The p-p+ junction 29 between the p+ region 28 and the channel 24 is back-biased to collect holes from the channel 24. As a potential well steps into the vicinity of the output region 28, any charge therein is drawn into the output region where it forms an output current which flows through the output lead 30. The output current through each lead 30 thus constitutes a scan conversion of the successive image points passing along the corresponding channel 24. An entire image is constituted by the output currents through the leads 30 from a whole line of output regions 28 formed in the successive channels 24 of compensator 20.

It will be understood that with the charge transfer control system discussed above, the charge collecting regions move along the channel in discrete steps rather than continuously. Thus what is meant by the charge collecting region moving along the channel at the same rate as the image is that a given image point will remain within one charge collecting region, although the extremes of the area around that point will sometimes be within the region and sometimes in the area separating the one charge collecting region from the next charge collecting region.

Although the readout or charge sensing means at the channel output point has been illustrated as a p+ region forming a pn junction with the n-type silicon main body of the semiconductor, it will be understood by those skilled in the art that any charge sensing means compatible with the device may be employed. Further, the device is not limited to the above charge transfer system but may be any charge transfer system which can be made photoresponsive, including, but not limited to bucket brigade and buried channel systems. Naturally the configuration of the charge collecting regions and the method of inducing and translating them will depend on the type of charge transfer system employed.

Although the structure an operation of the image motion compensator have been described in terms of the preferred four phase control system and a charge transfer channel, it will be understood that other control patterns and other charge transfer systems may be employed, so long as a given charge collecting region transfers at substantially the same rate as the image element which is generating the charge in the charge collecting region.

What is claimed is:

1. An integrating image motion compensator comprising:

photo-responsive charge transfer means, having an upper surface;

overlying transparent insulation means; and transparent charge transfer electrode means, spaced from the charge transfer means by the insulation means.

2. The apparatus of claim 1 further comprising readout means for sensing the charge in a charge collecting region.

3. The apparatus of claim 2 further comprising channel isolation means defining a plurality of parallel charge transfer channels within the charge transfer means.

4. The apparatus of claim 3 further comprising means for inducing separate charge collecting regions within the charge transfer means and for transferring the regions along the charge transfer means at a controllable rate.

5. An integrating image motion compensator comprising:

photo-responsive charge transfer means, having an upper surface;

overlying insulation means;

charge transfer electrode means spaced from the charge transfer means by the insulation means;

readout means for sensing the charge in the charge transfer means.

6. The apparatus of claim 5 further comprising channel isolation means defining a plurality of parallel charge transfer channels within the charge transfer means.

7. The apparatus of claim 6 further comprising means for inducing a plurality of separate charge collecting regions within each of the charge transfer channels and for transferring the regions along the charge transfer channels at a controllable rate.

8. The apparatus of claim 7 further comprising:

synchronization means for synchronizing the charge collecting region transfer rate with the rate of motion along the charge transfer means of an image focused thereon, whereby the same charge collection region travels with an image point throughout its movement along the charge transfer means.

9. The apparatus of claim 8 further comprising:

orientation means for aligning the charge transfer channel means with the direction of movement of the image, whereby a given image point travels along one of the plurality of channels defined within the charge transfer means.

10. The apparatus of claim 6 wherein the charge transfer electrode means comprises a plurality of parallel electrodes oriented at an angle with respect to the individual channels.

11. The apparatus of claim 10 wherein the charge transfer channel means comprises a semiconductor layer.

12. The apparatus of claim 11 wherein:

the isolation means is associated with the upper surface of the semiconductor layer;

13. The apparatus of claim 12 wherein the semiconductor layer is of a first conductivity type and the channel isolation means comprise semiconductor regions of the first conductivity type which are more heavily doped than the main semiconductor layer.

14. The apparatus of claim 10 wherein the electrodes are divided into first, second, third, and fourth electrode sets, each set being comprised of every fourth electrode and wherein each first electrode is adjacent one fourth electrode and one second electrode, each second electrode is adjacent one first electrode and one third electrode, each third electrode is adjacent one second electrode and one fourth electrode, and each fourth electrode is adjacent one third electrode and one first electrode, excepting only the end electrodes each of which is adjacent only one of the two specified electrodes.

15. The apparatus of claim 14 wherein adjacent electrodes are spaced apart vertically by the insulation means, but overlap horizontally to insure that potential wells induced by adjacent electrode are continuous.

16. An integrating image motion compensator comprising:

a layer of semiconductor material of a first conductivity type having length, breadth, depth and an upper surface;

a plurality of elongated semiconductor channel isolation regions of the first conductivity type associated with the upper surface of the semiconductor, said isolation regions being more heavily doped than the layer of semiconductor material;

an insulating layer overlying the semiconductor material;

a plurality of parallel electrodes oriented substantially perpendicular to the channel isolation regions, said electrodes being disposed in first and second parallel planes, spaced from the semiconductor and each other by the insulating layer, every other electrode along the length of the semiconductor layer being in the first plane and the alternate electrodes being in the second plane, each electrode other than the two end electrodes overlapping the two adjacent electrodes in the other plane.

17. A large field of view image motion compensating system comprising:

a plurality of integrating image motion compensators, each comprising:

photoresponsive charge transfer means, having an upper surface;

overlying insulation means;

charge transfer electrode means spaced from the charge transfer means by the insulation means;

channel isolation means defining a plurality of parallel charge transfer channels within the charge transfer means;

readout means for sensing the charge in a channel at a readout location;

optical field of view segmenting means for dividing a continuous field of view into a plurality of spacially separated segments, different image segments being focused on different integrating image motion compensators, whereby the combined output of all of the compensators constitutes a conversion of an image extending over more than one compensator.

18. The system of claim 17 further comprising means for inducing a plurality of separate charge collecting regions within the charge transfer channels of the image motion compensators and for transferring the charge collecting regions along the charge transfer channels at a controllable rate.

19. The apparatus of claim 18 further comprising: synchronization means for synchronizing the charge collecting region transfer rate with the rate of motion along the charge transfer means of an image focused thereon, whereby the same charge collection region travels with an image point throughout its movement along the charge transfer means of a given image motion compensator.

20. The apparatus of claim 19 further comprising: orientation means for orienting the image motion compensators with their charge transfer channels aligned with the direction of movement of the image, whereby a given image point travels along one of the plurality of channels of an image motion compensator.

21. A method of operating an integrating image motion compensator which comprises photoresponsive charge transfer means and control means therefor, said method comprising the steps of:

focusing an image to be converted onto the compensator;

inducing separate charge collecting regions within the charge transfer channel means;

transferring the charge collecting regions along the channel means; and sensing the charge in the charge transfer channel means at an output point.

22. The method of claim 21 further comprising the step of:

synchronizing the charge collecting region transfer rate with the rate of movement of the image across the image motion compensator.

23. The method of claim 21 further comprising the steps of:

sensing the rate of movement of the image across the image motion compensator;

synchronizing the charge collecting region transfer rate with the rate of movement of the image across the image motion compensator.

24. The method of claim 23 further comprising the step of:

aligning the individual charge transfer channels parallel to the direction of image motion.

* * * * *